J. T. OWENS.
STRETCHER.
APPLICATION FILED DEC. 6, 1918.
1,384,630.
Patented July 12, 1921.
3 SHEETS—SHEET 2.
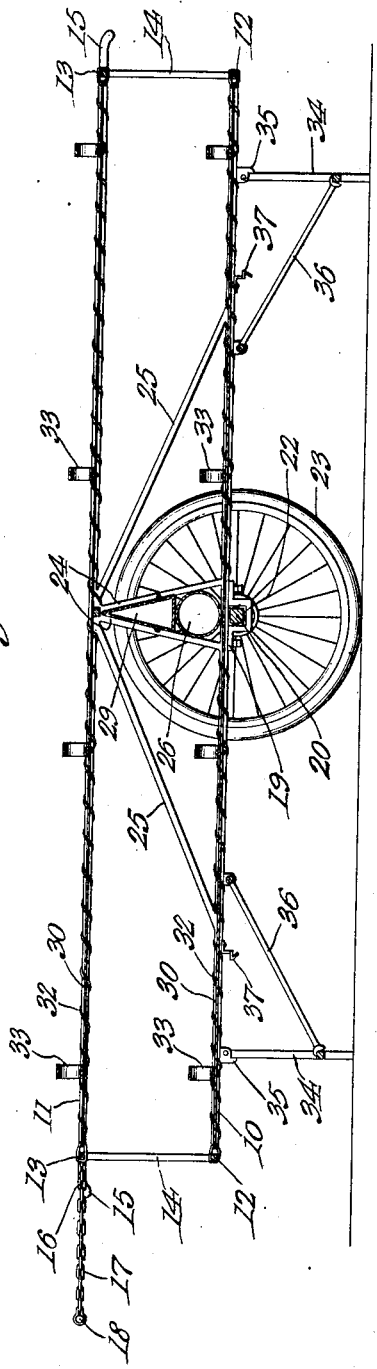
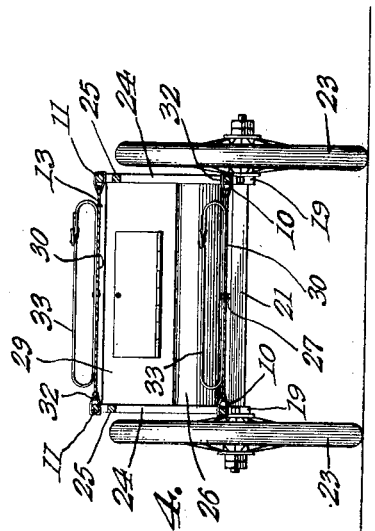
Inventor
J. T. Owens
By Victor J. Evans
Attorney J. T. OWENS.
STRETCHER.
APPLICATION FILED DEC. 6, 1918.
1,384,630.
Patented July 12, 1921.
3 SHEETS—SHEET 3.
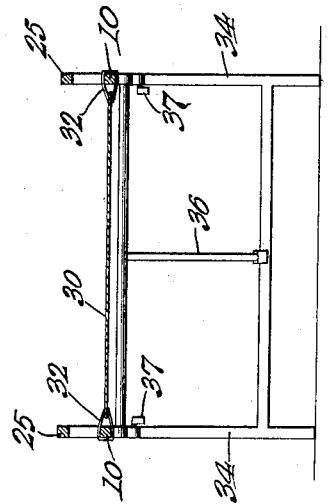
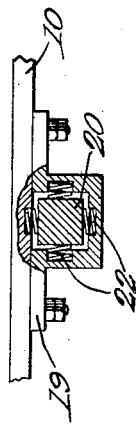
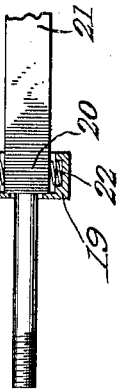
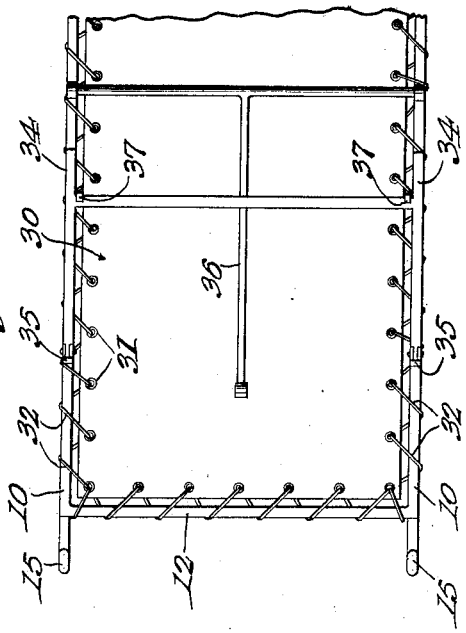
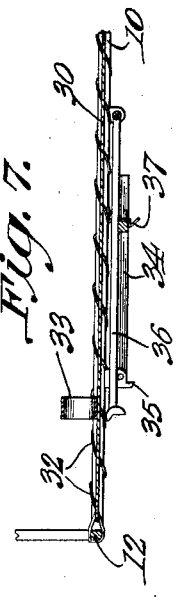
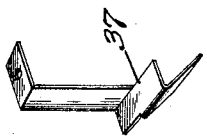
Inventor
J. T. Owens
By Victor J. Evans
Attorney

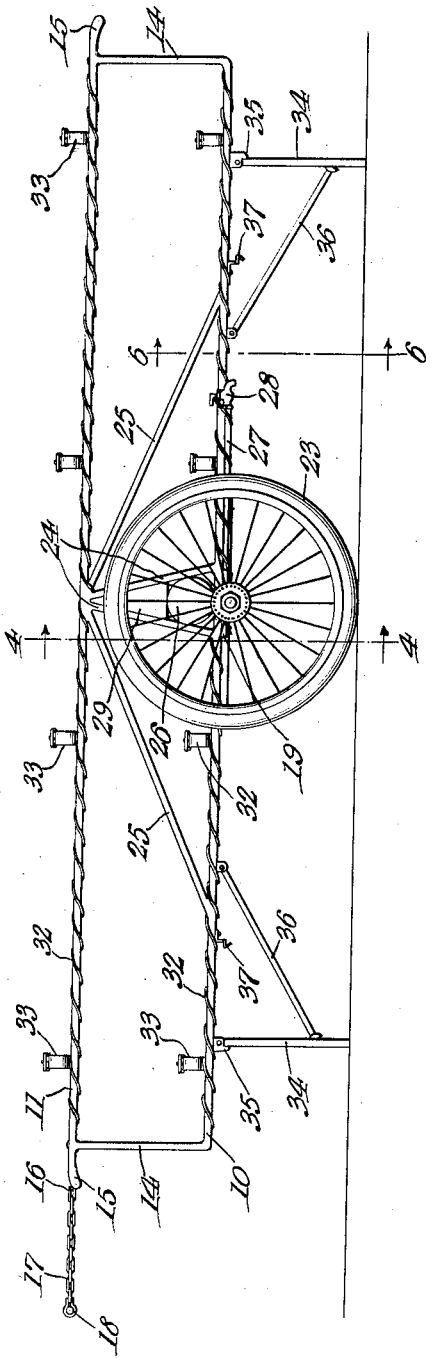

UNITED STATES PATENT OFFICE.

JOHN T. OWENS, OF NEW YORK, N. Y.

STRETCHER.

1,384,630.  Specification of Letters Patent.  Patented July 12, 1921.

Application filed December 6, 1918. Serial No. 265,551.

*To all whom it may concern:*

Be it known that I, JOHN T. OWENS, a citizen of the United States, residing at New York, in the county of New York and State of New York, have invented new and useful Improvements in Stretchers, of which the following is a specification.

This invention has reference to an improved means for conveying wounded from a battlefield to a base hospital, and has for its primary object to produce a device for this purpose whereby from one to four wounded soldiers may be transported in an easy manner by the operator or operators of the device with the least amount of inconvenience to the wounded.

A further object of the invention is to produce a means for conveying wounded persons from one place to another, that shall comprise a frame having wheels in the center thereof so that the same may be tilted to receive thereon the wounded, means being provided upon the device for strapping the wounded thereto so that danger of rolling or tossing in transportation will be prevented, the device being provided with handles at the ends thereof whereby the same may be carried over rough places when the wheeling thereof is not permitted.

It is a further object of the invention to produce a wheeled stretcher that may be operated by a single attendant or nurse for conveying one or a number of wounded from a field to a hospital.

It is a further object of the invention to produce a wheeled stretcher having connected therewith a fresh water tank, and if desired a medicament cabinet, so arranged as to brace or otherwise strengthen the construction of the stretcher.

It is a still further object of the invention to produce a device of this character which shall be of a comparatively simple construction, cheap to manufacture, and thoroughly efficient for the purpose for which it is devised.

Other objects and advantages will present themselves as the nature of the invention is better understood, reference being had to the accompanying drawings, in which:

Figure 1 is a side elevation of the improvement.

Fig. 2 is a top plan view thereof.

Fig. 3 is a sectional view approximately on the line 3—3 of Fig. 2.

Fig. 4 is a transverse sectional view approximately on the line 4—4 of Fig. 1.

Fig. 5 is a view showing the manner in which the supports and braces therefor may be sustained against the bottom of the frame, as when the stretcher is being wheeled or carried.

Fig. 6 is a sectional view approximately on the line 6—6 of Fig. 1.

Figs. 7 to 10 illustrate details.

As disclosed by the drawings the improved stretcher includes a base and a top.

The base and top each include a substantially rectangular frame of a desired width and length. Each of the frames is made up of spaced longitudinal bars or rods 10—10 and 11—11 respectively. The rods 10 for the base, and the rods 11 for the top have their ends connected by transverse rods 12—12 and 13—13 respectively, and the frame comprising the top is spaced from the frame comprising the bottom by vertically arranged corner rods 14. The rods 11 providing the sides of the top are extended beyond the end rods 13 thereof and these extended portions are bent or rounded downwardly to provide handles 15, whereby the device may be carried by two attendants or whereby the device may be tilted from the center thereof (on which is arranged the wheels hereinafter to be described) so that a patient may be arranged thereon from either end thereof in a convenient manner. In addition to the handles 15, there is secured to the top of the device, at the front end thereof a flexible element, such as a chain 16, the said chain being centrally provided with a lead 17 to which is secured a handle 18, and this handle is employed when the device is wheeled.

Secured to the under faces of the bars or rods 10 of the bottom of the device, centrally thereof, and in registering alinement are brackets 19, the said brackets being connected by bolts having ordinary and lock nuts thereon, and these brackets 19 provide supports for the squared central portion 20 of an axle 21. Preferably, if desired, suitable cushioning means 22 is provided between the straight or rectangular portion 20 of the axle 21, the brackets and the side bars of the lower portion of the stretcher, but this cushioning means does not permit of a movement of the axle in a longitudinal direction.

On the spindles of the axle 21, which project outward of the sides of the stretcher, are journaled wheels 23, the said wheels being secured on the said spindle by both ordinary and lock nuts. The wheels 23 preferably have cushioning tires.

Between the side bars 10 and 11 of the top and bottom, at the center of the device are arranged truss supports, comprising inclined bars 24 each having their spread ends connected to the sides 10. Between the braces 24, the upper bars 11 and the lower bars 12 of the top and bottom are arranged additional angle brace bars 25 which are also in the nature of truss members. Between the truss bars 24, and secured thereto is a transversely arranged tank 26 having an outlet pipe 27 arranged along the under side of one of the bars 10, the said outlet pipe being provided with a cock or valve 28. The tank is designed to receive fresh water which is to be administered to the patient or patients for quenching the thirst or for cleaning wounds. Above the tank 26, and also secured to the truss brace members 24 may and preferably is arranged a cabinet 29 designed to contain medicaments for imparting first aid to the wounded. The cabinet may wholly inclose the tank, and both of these elements serve to strengthen the device at the center thereof as well as divide the lower portion of the device into two compartments, and in fact likewise dividing the upper portion of the device into separate berths. These berths are formed by having canvas sheets 30 laced to the bars comprising the upper and lower frames. The canvas sheets 30 are provided with metallic eyelets adjacent to the edges thereof which are indicated by the numeral 31, the lacing 32 being in the nature of strong cord or tape. By thus providing the top and base of the construction with canvas bottoms, and by regulating the lacing thereof the patient may be arranged in either of the berths or compartments to rest at comparative ease. On the canvas bottom of each of the berths or compartments, at desired spaced intervals are secured tying straps 33. These straps perferably comprise right angularly arranged members that are centrally secured to the canvas members 30 and have their ends provided with means whereby either of the straps may be connected. The straps are preferably constructed of canvas and may be suitably padded, and the pivotal means for securing the same to the canvas 30 is likewise protected so that injury will not be inflicted to the patients.

Hingedly secured to the bars or rails 10 adjacent to the ends of the device are supports 34 designed to hold the construction in a substantially horizontal position when the device is stationary. The supports are held against outward swinging movement by contact with the lugs 35 to which the leg portions of the support are pivotally secured, and each of the leg members of each of the said supports has removably latched thereto the outer end of angularly disposed brace members 36, the said brace members being pivotally or hingedly secured to the under faces of the side bars or rails 10. The side bars 10 are provided with depending catch members 37 adapted to engage with the legs of the props 34 and with the brace members 36, when the brace members are brought out of engagement with the props and both the brace and props are folded against the bottom of the construction.

It will be apparent, from the foregoing description, when taken in connection with the drawings that the canvas 30 for the berths may be readily removed for cleaning, etc.; that the canvas for any of the berths not required may be dispensed with; that the canvas for the upper berths provides a shield or canopy for the lower berths; that the device may be either wheeled or carried; that the arrangement of the water receptacle and medicament cabinet braces the construction at the center thereof; that the construction is comparatively simple; that the device may be wheeled by a single attendant or carried by two attendants; and that either one, two, three or four patients may be conveyed on the stretcher.

Having thus described the invention, what is claimed as new, is:—

A stretcher comprising upper and lower frames, corner posts connecting the frames, truss braces between the sides of the respective frames, an angular member secured to the inner truss braces and dividing the lower frame into two compartments and the upper frame into two berths, fabric facings removably and adjustably secured to the frames, wheels centrally journaled on the lower frame, and foldable supports on the lower frame adjacent to the ends thereof.

In testimony whereof I affix my signature.

JOHN T. OWENS.